US007734793B2

(12) United States Patent
Bowman-Amuah

(10) Patent No.: US 7,734,793 B2
(45) Date of Patent: Jun. 8, 2010

(54) SERVICE CONTROL FRAMEWORK FOR SEAMLESS TRANSFER OF A MULTIMEDIA CONFERENCE OVER DIFFERENT MEDIA

(75) Inventor: Michel K. Bowman-Amuah, Colorado Springs, CO (US)

(73) Assignee: Accenture Global Services GmbH, Schaffhausen (CH)

( * ) Notice: Subject to any disclaimer, the term of this patent is extended or adjusted under 35 U.S.C. 154(b) by 985 days.

(21) Appl. No.: 10/307,142

(22) Filed: Nov. 27, 2002

(65) Prior Publication Data

US 2004/0030749 A1 Feb. 12, 2004

Related U.S. Application Data

(60) Provisional application No. 60/333,595, filed on Nov. 27, 2001.

(51) Int. Cl.
*G06F 15/173* (2006.01)
(52) U.S. Cl. .................................. 709/228; 709/204
(58) Field of Classification Search .................. 709/227, 709/204, 228
See application file for complete search history.

(56) References Cited

U.S. PATENT DOCUMENTS

| 5,539,395 | A | 7/1996 | Buss et al. |
| 5,572,582 | A | 11/1996 | Riddle |
| 5,793,762 | A | 8/1998 | Penners et al. |
| 5,852,775 | A | 12/1998 | Hidary et al. |
| 5,907,598 | A | 5/1999 | Mandalia et al. |
| 5,907,837 | A | 5/1999 | Ferrel et al. |
| 5,949,975 | A | 9/1999 | Batty et al. |
| 6,125,108 | A | 9/2000 | Shaffer et al. |
| 6,125,113 | A | 9/2000 | Farris et al. |
| 6,185,204 | B1 | 2/2001 | Voit |

(Continued)

FOREIGN PATENT DOCUMENTS

JP 6077958 3/1994

(Continued)

OTHER PUBLICATIONS

Office Action issued on Aug. 24, 2007 by US PTO on U.S. Appl. No. 10/306,979.

(Continued)

*Primary Examiner*—Nathan J Flynn
*Assistant Examiner*—Chirag R Patel
(74) *Attorney, Agent, or Firm*—Finnegan, Henderson, Farabow, Garrett & Dunner, LLP

(57) ABSTRACT

A system, method and computer program product are provided for seamless transfer of a conference over different media. Initially, a conference is initiated on a first medium with a first set of associated capabilities utilizing a network. During use, a request to transfer the conference to a second medium is received utilizing the network. A second set of capabilities associated with the second medium is then determined in response to the request. Aspects of the conference requiring the first set of capabilities associated with the first medium are then disabled in response to the request. In a similar manner, aspects of the conference supported by the second set of capabilities associated with the second medium are enabled in response to the request. The conference is thus seamlessly continued on the second medium.

40 Claims, 6 Drawing Sheets

U.S. PATENT DOCUMENTS

| | | | |
|---|---|---|---|
| 6,275,692 B1 | 8/2001 | Skog | |
| 6,363,411 B1 | 3/2002 | Dugan et al. | |
| 6,366,567 B1* | 4/2002 | Singh et al. | 370/296 |
| 6,377,993 B1 | 4/2002 | Brandt et al. | |
| 6,385,592 B1 | 5/2002 | Angles et al. | |
| 6,421,719 B1 | 7/2002 | Lewis et al. | |
| 6,425,005 B1 | 7/2002 | Dugan et al. | |
| 6,434,381 B1 | 8/2002 | Moore et al. | |
| 6,470,386 B1 | 10/2002 | Combar et al. | |
| 6,560,222 B1 | 5/2003 | Pounds | |
| 6,631,122 B1 | 10/2003 | Arunachalam et al. | |
| 6,647,257 B2 | 11/2003 | Owensby | |
| 6,732,080 B1 | 5/2004 | Blants | |
| 6,756,918 B2 | 6/2004 | Fomukong | |
| 6,769,000 B1 | 7/2004 | Akhtar et al. | |
| 6,775,255 B1 | 8/2004 | Roy | |
| 6,898,641 B1 | 5/2005 | Kobayashi | |
| 6,920,319 B2 | 7/2005 | Knutsson et al. | |
| 6,976,087 B1 | 12/2005 | Westfall et al. | |
| 6,996,768 B1 | 2/2006 | Elo et al. | |
| 7,154,056 B2 | 12/2006 | Bergovist et al. | |
| 2001/0010054 A1 | 7/2001 | Orii et al. | |
| 2001/0043148 A1 | 11/2001 | Stewart | |
| 2002/0007400 A1 | 1/2002 | Pedersen | |
| 2002/0077121 A1 | 6/2002 | Ketola | |
| 2002/0176579 A1 | 11/2002 | Deshpande et al. | |
| 2003/0055977 A1* | 3/2003 | Miller | 709/227 |
| 2003/0063072 A1* | 4/2003 | Brandenberg et al. | 345/173 |
| 2003/0069693 A1 | 4/2003 | Snapp et al. | |
| 2004/0030705 A1 | 2/2004 | Bowman-Amuah | |
| 2004/0205153 A1 | 10/2004 | Weisshaar et al. | |
| 2005/0080665 A1 | 4/2005 | Bowman-Amuah | |

FOREIGN PATENT DOCUMENTS

| | | |
|---|---|---|
| WO | WO98/38814 | 9/1998 |
| WO | WO98/59503 | 12/1998 |
| WO | WO 99/03050 | 1/1999 |
| WO | WO00/23864 | 4/2000 |
| WO | WO00/35216 | 6/2000 |
| WO | WO 00/46713 | 8/2000 |
| WO | WO 00/62564 | 10/2000 |
| WO | WO00/77978 | 12/2000 |
| WO | WO 01/22198 | 3/2001 |
| WO | WO 01/22748 | 3/2001 |
| WO | WO01/76170 | 10/2001 |
| WO | WO01/76173 | 10/2001 |
| WO | WO01/89189 | 11/2001 |
| WO | WO 01/98936 | 12/2001 |
| WO | WO01/ 98936 | 12/2001 |

OTHER PUBLICATIONS

Office Action issued Dec. 3, 2007 by EPO on European Application No. 02 789 915.2-1238.
Office Action issued on Jan. 24, 2008 by US PTO on U.S. Appl. No. 10/647,411.
Office Action issued on Feb. 25, 2008 by US PTO on U.S. Appl. No. 10/306,979.
Office Action issued Jan. 30, 2008 by EPO enclosing supplementary European Search Report on Application No. 02786819.9-1244.
Examination Report issued May 19, 2008 by the EPO on Application No. 02 784 643.5-1238.
Office Action issued on Jul. 21, 2008 by US PTO on U.S. Appl. No. 10/647,411.
Suryanarayana, L. et al., "CC/PP for Content Negotiation and Contextualization" Lecture Notes in Computer Science, Springer Verlag, New York, NY, US, vol. 1987, Jan. 8, 2001, pp. 239-245, XP001086530, ISSN: 0302-9743.
McDysan, D. et al. "Multiservice Networking Using a Component-Based Switch and Router Architecture" Proceedings of the IEEE Conference 2000 on High Performance Switching and Routing. Heidelberg, Germany, Jun. 26-29, 2000, Proceedings of the IEEE Conference on High Performance Switching and Routing, New York, NY: IEEE, US, Jun. 26, 2000, pp. 97-104, XP001075691 ISBN: 0-7803-5884-8.
Low, C., "Integrating Communication Services" IEEE Communications Magazine, IEEE Service Center, New York, NY, US. vol. 35, No. 6, Jun. 1997, pp. 164-169, XP000659204 ISSN:0183-6804.
Deserres, Y. et al. "Value-Added Services in the Converged Network" IEEE Communications Magazine, IEEE Service Center, New York, NY, US. vol. 39, No. 9, Sep. 2001, pp. 146-154, XP001107762 ISSN: 0163-6804.
*Dayco* Statement Regarding Related Applications.
Office Action, dated Aug. 7, 2008, for U.S. Appl. No. 10/306,979, filed Nov. 27, 2002 (15 pages).
Office Action, dated Feb. 25, 2008, for U.S. Appl. No. 10/306,979, filed Nov. 27, 2002 (13 pages).
Office Action, dated Aug. 24, 2007, for U.S. Appl. No. 10/306,979, filed Nov. 27, 2002 (11 pages).
Office Action, dated May 5, 2006, for U.S. Appl. No. 10/306,979, filed Nov. 27, 2002 (11 pages).
Advisory Action, dated Apr. 16, 2009, for U.S. Appl. No. 10/647,411, filed Aug. 25, 2003 (3 pages).
Office Action, dated Jan. 29, 2009, for U.S. Appl. No. 10/647,411, filed Aug. 25, 2003 (7 pages).
Office Action, dated May 30, 2007, for U.S. Appl. No. 10/647,411, filed Aug. 25, 2003 (6 pages).
Office Action, dated Oct. 4, 2006, for U.S. Appl. No. 10/647,411, filed Aug. 25, 2003 (7 pages).
Office Action, dated Jan. 25, 2006, for U.S. Appl. No. 10/647,411, filed Aug. 25, 2003 (6 pages).
Notice of Allowance, dated Feb. 6, 2009, for U.S. Appl. No. 10/306,979, filed Nov. 27, 2002 (7 pages), with Reply to Office Action, filed Nov. 7, 2008, including listing of allowed claims (21 pages).
Office Action, dated Jan. 16, 2006, enclosing Supplementary European Search Report in European Application No. 02789915.2 - 2221 (5 pages).
PCT Written Opinion, dated Jun. 7, 2006, for International Application No. PCT/US02/38137 (7 pages).
PCT International Preliminary Examination Report, dated Jun. 18, 2007, for International Application No. PCT/US02/38137 (8 pages).
PCT International Preliminary Examination Report, dated Feb. 27, 2004, for International Application No. PCT/US02/38138 (5 pages).
Notice of Allowance and Allowability, dated May 14, 2009, for U.S. Appl. No. 10/306,979, filed Nov. 27, 2002 (8 pages) with Reply to Office Action, filed Nov. 7, 2008, including listing of allowed claims (21 pages).
Advisory Action, dated Apr. 16, 2009, for U.S. Appl. No. 10/647,411, filed Aug. 25, 2003 (3 pages).

* cited by examiner

SERVICE CONTROL FRAMEWORK FOR SEAMLESS TRANSFER OF A MULTIMEDIA CONFERENCE OVER DIFFERENT MEDIA

RELATED APPLICATIONS

This application is related to co-pending applications entitled "SERVICE CONTROL ARCHITECTURE" and "CONTEXT SENSITIVE ADVERTISEMENT DELIVERY FRAMEWORK" which are each invented by Michel K. Bowman-Amuah and filed concurrently herewith Ser. Nos. 10/306,979, 10/307,120, respectively, and which are incorporated herein by reference in their entirety for all purposes.

FIELD OF THE INVENTION

The present invention relates to conferencing, and more particularly to network conferencing with multimedia capabilities.

GENERAL BACKGROUND AND STATE OF THE ART

In hosting a multimedia conference over a computer network such as the Internet, the conference host advertises and promotes the conference as to the subject matter of the conference and the time and location of the conference. Parties interested in participating in the conference join the conference via their network connections at the designated time.

The traditional paradigm of an on-line conference, referring to FIG. 1, consists of a host server 10 connecting a number of conference participants or clients 12a-12c through their respective individual channels 14a-14c. This is a client/server paradigm where the host server 10 connects the clients 12a-12c. Under this paradigm, a great deal of computing resources are consumed by the host server 10.

The traditional paradigm is no longer adequate in meeting the dynamic and flexible environment demanded by the activity of the network users of today and of the future. Ideally, given the level of activity on the Internet, a different paradigm, referring to FIG. 2, is desirable. In this peer-to-peer paradigm, there is no host server, and a number of clients 18a-18e are connected via a number of channels 20a-20e in a variety of manners. The advantage with this paradigm is that there is not a central host server to connect the clients 18a-18e. As long as the clients 18a-18e utilize application programs allowing communication across networks between the clients 18a-18e, this network paradigm is feasible and desirable.

During use of either of the foregoing paradigms, the conference is started, for example as follows: One of the participants in the conference, for example, the sponsor of the conference contacts a client with reference, for example, to a conference schedule table so as to establish the necessary communication circuit between them. Thus, the multimedia conference is started. Once the conference has started, the sponsor of the conference may contact other remote clients with reference to the conference schedule table, so as to establish the necessary communication circuits among them.

Once started, a problem may arise when a user at one of the clients must move from his or her client device. This may occur, for example, if the user has to begin to move to another scheduled meeting, or address another situation before the present conference is over. Unfortunately, the conferences are often held on clients that include desktop computers or workstations which feature many multimedia capabilities, but which lack mobility. In such case, the client must often prematurely terminate the conference.

There is thus a need for a system capable of allowing a user to seamlessly transfer between different multimedia media during a conference.

INVENTION SUMMARY

A system, method and computer program product are provided for seamless transfer of a conference over different media. Initially, a conference is initiated on a first medium with a first set of associated capabilities utilizing a network. During use, a request to transfer the conference to a second medium is received utilizing the network. A second set of capabilities associated with the second medium is then determined in response to the request. Aspects of the conference requiring the first set of capabilities associated with the first medium are then disabled in response to the request. In a similar manner, aspects of the conference supported by the second set of capabilities associated with the second medium are enabled in response to the request. The conference is thus seamlessly continued on the second medium.

In one embodiment, the first and second media includes a desk top computer, a personal digital assistant, a palm computer, a lap top computer, and/or a cellular phone. In one embodiment, the capabilities of the first medium are greater than the capabilities of the second medium.

In another embodiment, a plurality of settings on the second medium is matched with a plurality of settings on the first medium. As an option, the settings may include device settings, user settings, and/or network settings.

In still another embodiment, the aspects supported by the various capabilities include performance, features and/or a format. As an option, the method may be carried out utilizing a service control architecture. In one aspect of the present embodiment, the service control architecture may include a database, a profiler module, an application module, a network resource module, a presentation module, and a policy server.

BRIEF DESCRIPTION OF THE DRAWINGS

Prior art

Prior art

DETAILED DESCRIPTION OF THE PREFERRED EMBODIMENTS

Figure 3:
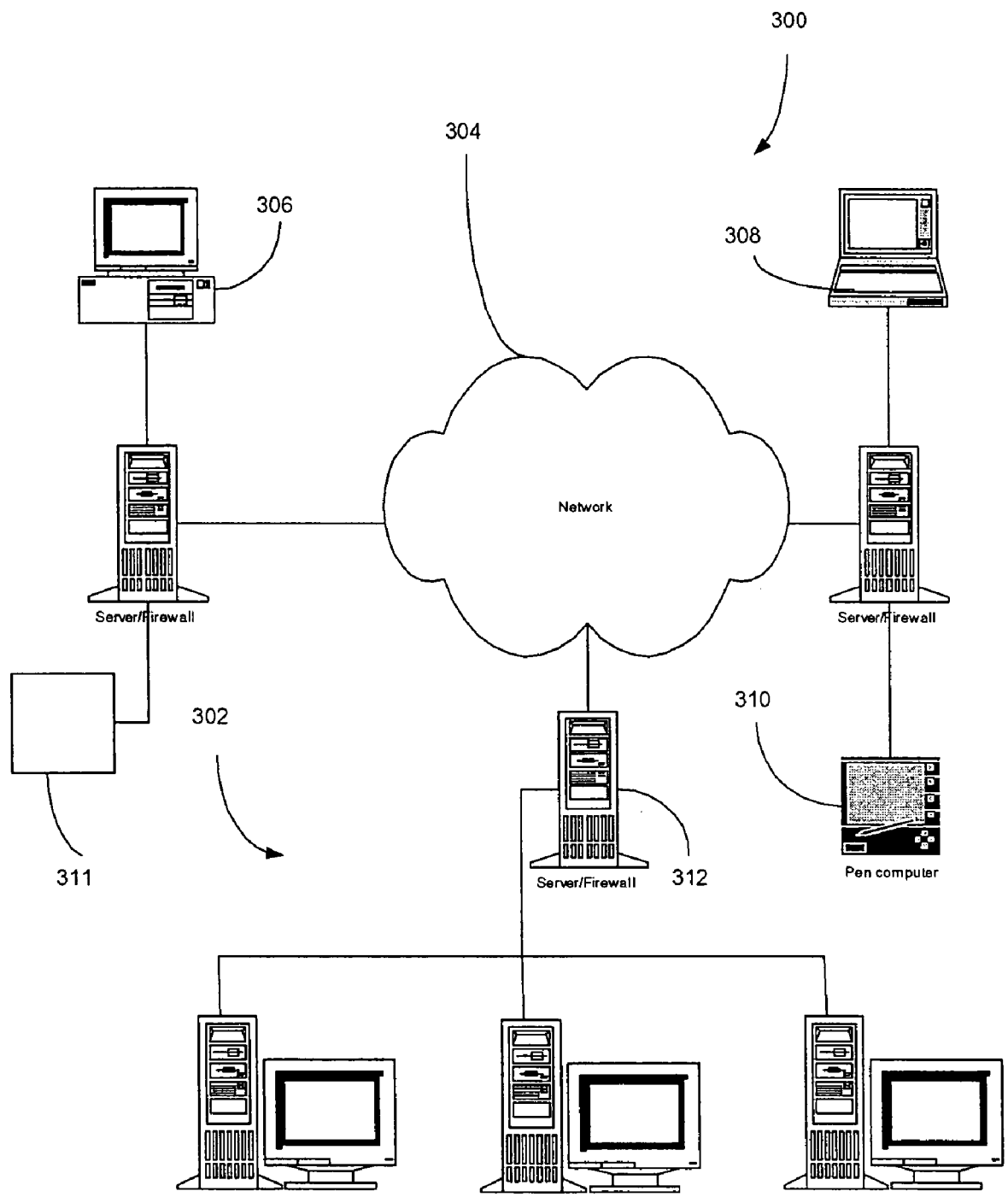
FIG. 3 illustrates an exemplary network environment with a plurality of components with which one embodiment of the present invention may be implemented.

FIG. 3 illustrates an exemplary network environment 300 with a plurality of components 302 with which one embodiment of the present invention may be implemented. As shown, such components 302 may include a network 304 which may take any form including, but not limited to a local area network (LAN), a wide area network (WAN) such as the Internet, etc. Coupled to the network 304 is a plurality of media which may take the form of desktop computers 306, lap-top computers 308, hand-held computers 310, or any other type of computing hardware/software 311. As an option, the various computers may be connected to the network 304 by way of a server 312 which may be equipped with a firewall for security purposes.

In use, the various media of FIG. 3 are each capable of conducting a multimedia conference with other media. In the context of the present invention, a multimedia conference may include any type of communication between a plurality of media. Such communication may include, but is not limited to text, speech visual, or any other type of communication. As will soon become apparent, each of the media has a unique set of capabilities which may be exploited to enhance a particular conference.

If at any point during the conference, a user at one of the media must move from the current medium, the present embodiment allows the user to seamlessly switch from the current media to a second medium. Often, such second medium is a mobile medium that allows the user to continue the conference while in transit.

Figure 4:
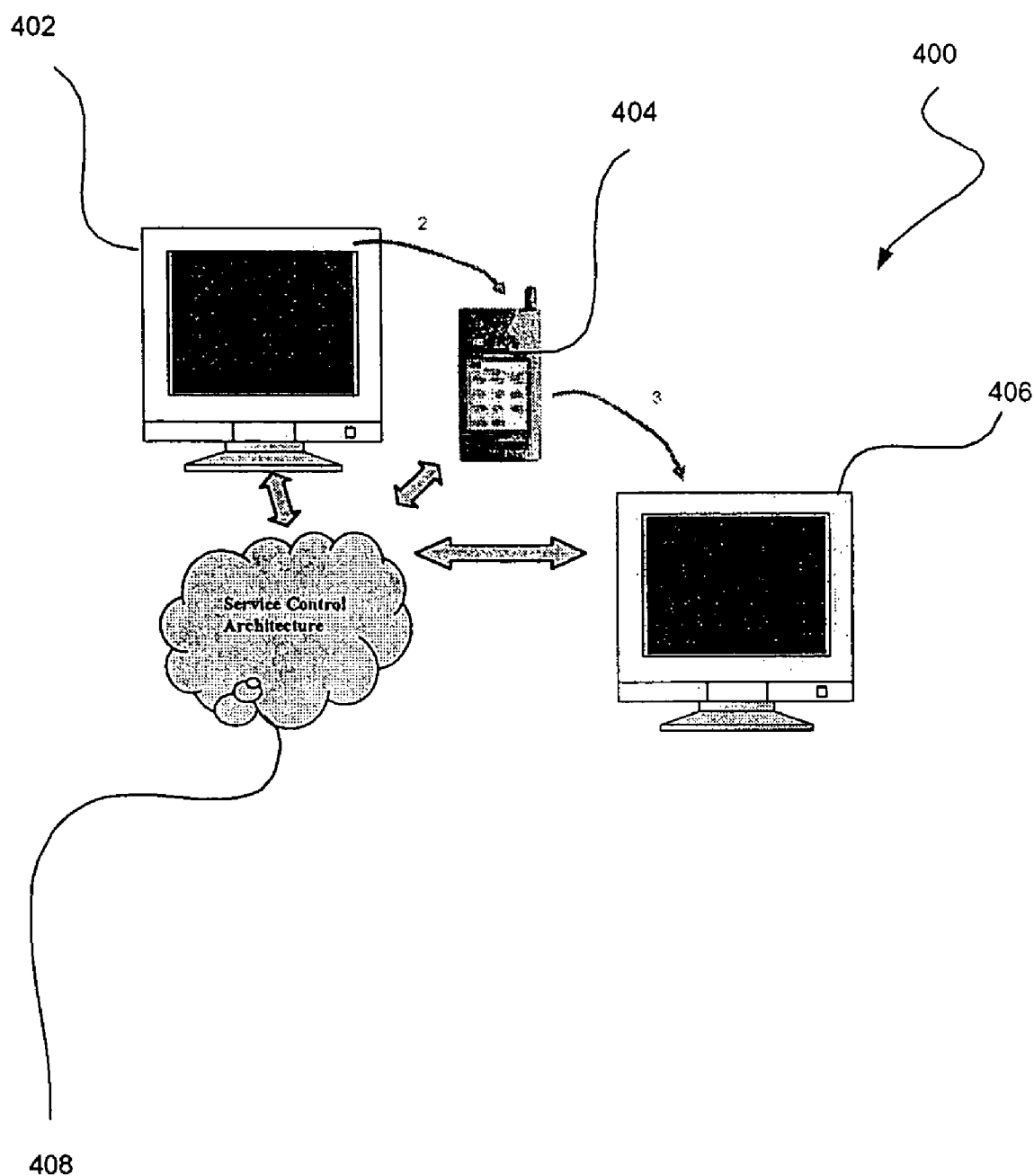
FIG. 4 illustrates an exemplary scenario in which a user seamlessly transfers a conference from a first medium to a second and third medium, in accordance with one embodiment.

FIG. 4 illustrates an exemplary scenario 400 in which a user seamlessly transfers a conference from a first medium to a second and third medium, in accordance with one embodiment. As shown, a first medium 402 is provided with a first set of associated capabilities. In one embodiment, the first medium 402 may include a desktop computer or some other type of stationary medium.

Next provided is a second medium 404 with a second set of associated capabilities. As an option, the second medium 404 may include a personal digital assistant, a palm computer, a lap top computer, a cellular phone, or any other type of mobile media. Since mobile media are typically small clients, the capabilities of the first medium 402 may be greater than the capabilities of the second medium 404 in the context of the present embodiment.

Still yet, a third medium 406 is included with a third set of associated capabilities. The third medium 406 may include a desktop computer or some other type of stationary media similar, but not necessarily exactly like the first medium 402. Of course, the first medium 402, second medium 404, and third medium 406 may each include any type of computing media, including, but not limited to a desk-top computer, a personal digital assistant (PDA), a palm-top computer, a laptop computer, and/or a cellular phone.

In the present embodiment, the capabilities of each of the different media may pertain to any resource parameter associated with the media. For example, the capabilities may refer to computing capabilities, data storage capabilities, data transmission capabilities, I/O capabilities, and/or any other resource parameter.

It should be noted that such capabilities each serve to support different aspects of a typical conference. Examples of different aspects include performance (i.e. visual quality, audio quality, network bandwidth, etc.), format, features (i.e. shared whiteboards, real-time textual communications, text-to-voice capability, conference note-taking, etc.) and/or any other aspect of a conference. Moreover, the different aspects may refer to any computing ability, data storage ability, data transmission ability, I/O ability, etc. associated with the conference.

Still yet, various conference settings may initially be set before or during the conference. These settings may include device settings, user settings, and/or network settings. Device settings may refer to volume, contrast, color, and/or any other setting relating to the media. Further, user settings may refer to profiling, alarms, and/or any other settings relating to the user. Still yet, the network settings may include connection, bandwidth, etc. related to the network. As is readily apparent, the device, user, and network settings may overlap.

Coupled to the first medium 402, second medium 404, and third medium 406 is a service control architecture 408 implemented on the network environment 300 of FIG. 3. It should be noted that the service control architecture 408 may include any set of servers, databases, etc. operating as components of the network environment 300. One particular example of a service control architecture 408 will be set forth during reference to FIGS. 6 and 7. In use, the service control architecture 408 manages the capabilities and settings associated with the first medium 402, second medium 404, and third medium 406 to permit seamless transfer of a conference between the media.

Figure 1:
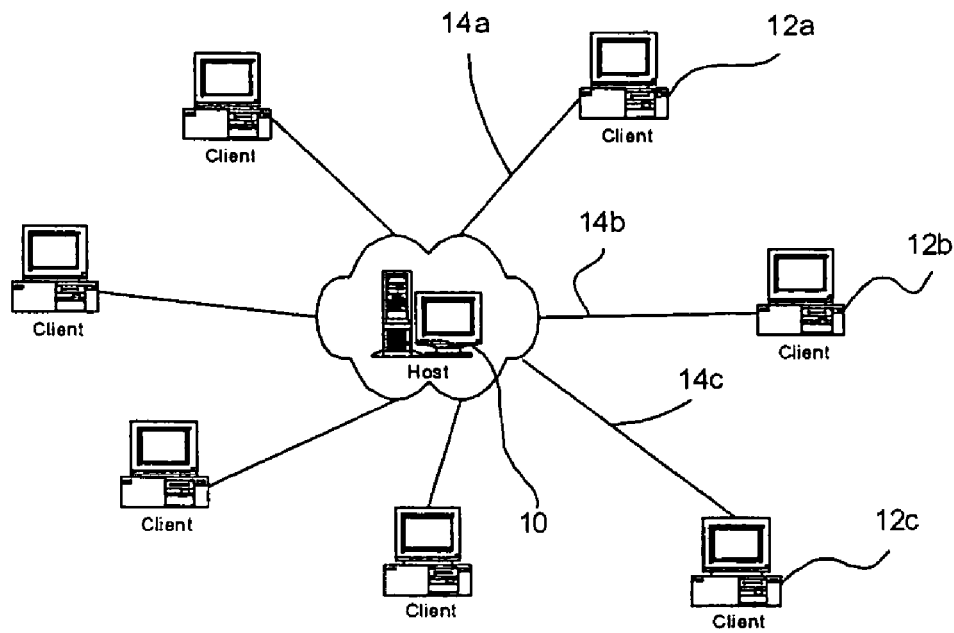
FIG. 1 illustrates connections in accordance with a client/server paradigm where users are connected to a central server for the purpose of conferencing.
Figure 2:
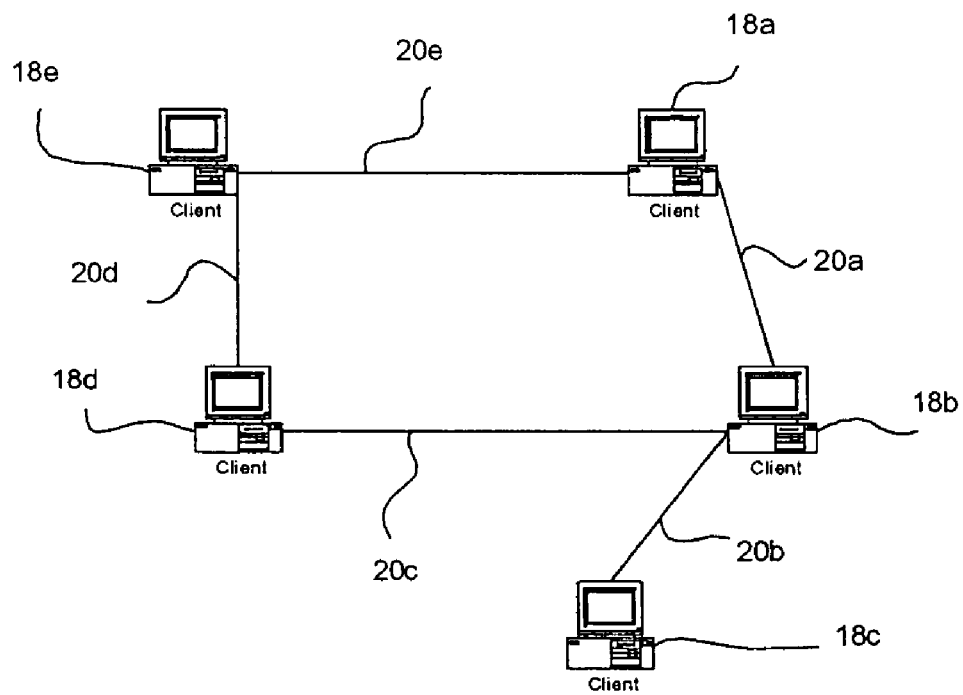
FIG. 2 illustrates connections in accordance with a peer-to-peer paradigm where users are connected to each other without a central host.
Figure 5:
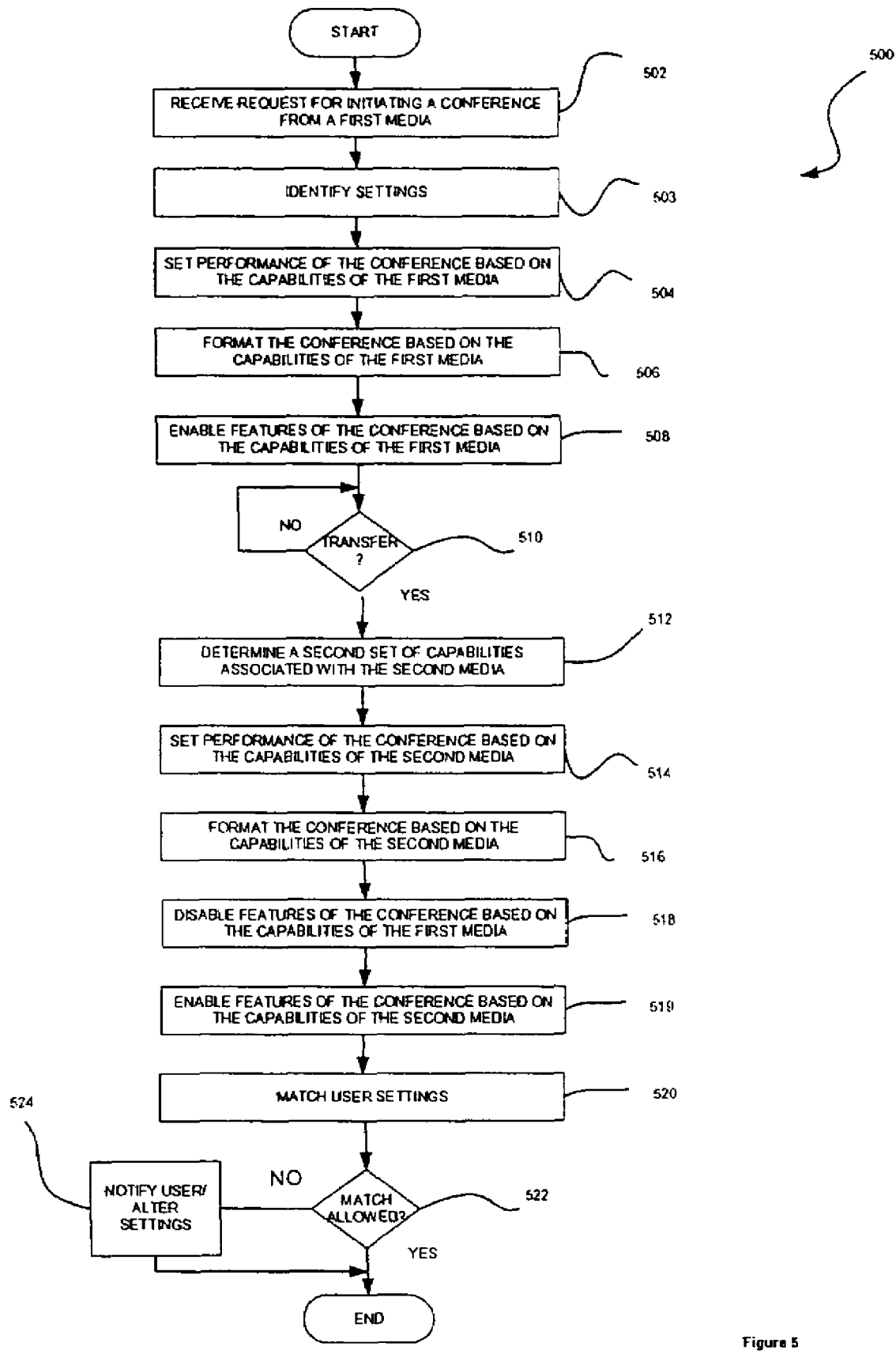
FIG. 5 is a flow diagram illustrating an exemplary method of seamlessly transferring a conference between different media.

FIG. 5 is a flow diagram illustrating an exemplary method 500 of seamlessly transferring a conference between different media. As shown, in operation 502, a request is initially received for initiating a conference. As set forth during the discussion of FIGS. 1 and 2, a request may be received from a particular user at one of the media. In the present example, the request may be received by the user using the first medium 402.

In response to the request, the service control architecture 408 initiates the conference on the first medium 402 with a first set of associated capabilities. In order to personalize the conference from the perspective of the user, user settings similar to those described hereinabove are identified in operation 503.

It should be noted that the conference on the first medium 402 is executed with specific aspects supported by the first set of capabilities associated with the first medium 402. In particular, a performance of the conference is set in accordance with the first set of capabilities associated with the first medium 402. Note operation 504. Further, in operation 506, the conference on the first medium 402 is formatted in accordance with the first set of capabilities associated with the first medium 402. Still yet, certain features of the conference supported by the first set of capabilities associated with the first medium 402 are enabled. Note operation 508.

For example, in an embodiment where the first medium 402 is a desktop computer, a high bandwidth connection may be utilized while enabling high-definition television (HDTV)-quality video along with compact disc (CD)-quality sound. Moreover, a group sharing whiteboard feature may be enabled.

The conference is then continued until a request is received to transfer the conference to the second medium 404. See decision 510. It should be noted that such request may be sent from the first medium 402 or the second medium 404. In response to the request, the service control architecture 408 determines the second set of capabilities associated with the second medium 404. This may be accomplished by simply identifying the second medium and looking up the associated capabilities, or receiving a list of such capabilities from the second medium 404. See operation 512.

In operation 514, a performance of the conference is set in accordance with the second set of capabilities associated with the second medium 404. Next, in operation 516, the conference on the second medium 404 is formatted in accordance with the second set of capabilities associated with the second medium 404. Still yet, certain features of the conference supported by the first set of capabilities associated with the first medium 402 are disabled. Note operation 518. Further, certain features of the conference supported by the second set of capabilities associated with the second medium 404 are enabled. Note operation 519. Finally, various user settings identified in operation 503 are set on the second medium 404 in operation 520.

For example, in an embodiment where the second medium 404 is a cellular phone, the high-definition television (HDTV)-quality video may be disabled. Moreover, the group sharing whiteboard feature may be disabled, while the text-to-voice capability is enabled.

Next, it is determined whether any of the various settings can not be matched in operation 520 due to deficiencies in the capabilities of the second medium 404. Note decision 522. If this is the case, the user is notified, and such settings are dropped in operation 524.

By this design, the conference may be seamlessly continued on the second medium 404. It should be noted that a similar process may occur to seamlessly transfer the conference from the second medium 404 to the third medium 406, or any other media. Moreover, the conference may be transferred back and forth between the media as desired.

More information will now be set forth regarding an exemplary service control architecture 408 that may be used to implement the method 500 of FIG. 5. It should be noted, however, that the service control architecture 408 set forth below is meant for illustrative purposes only, and should not be construed as limiting in any manner.

Figure 6:
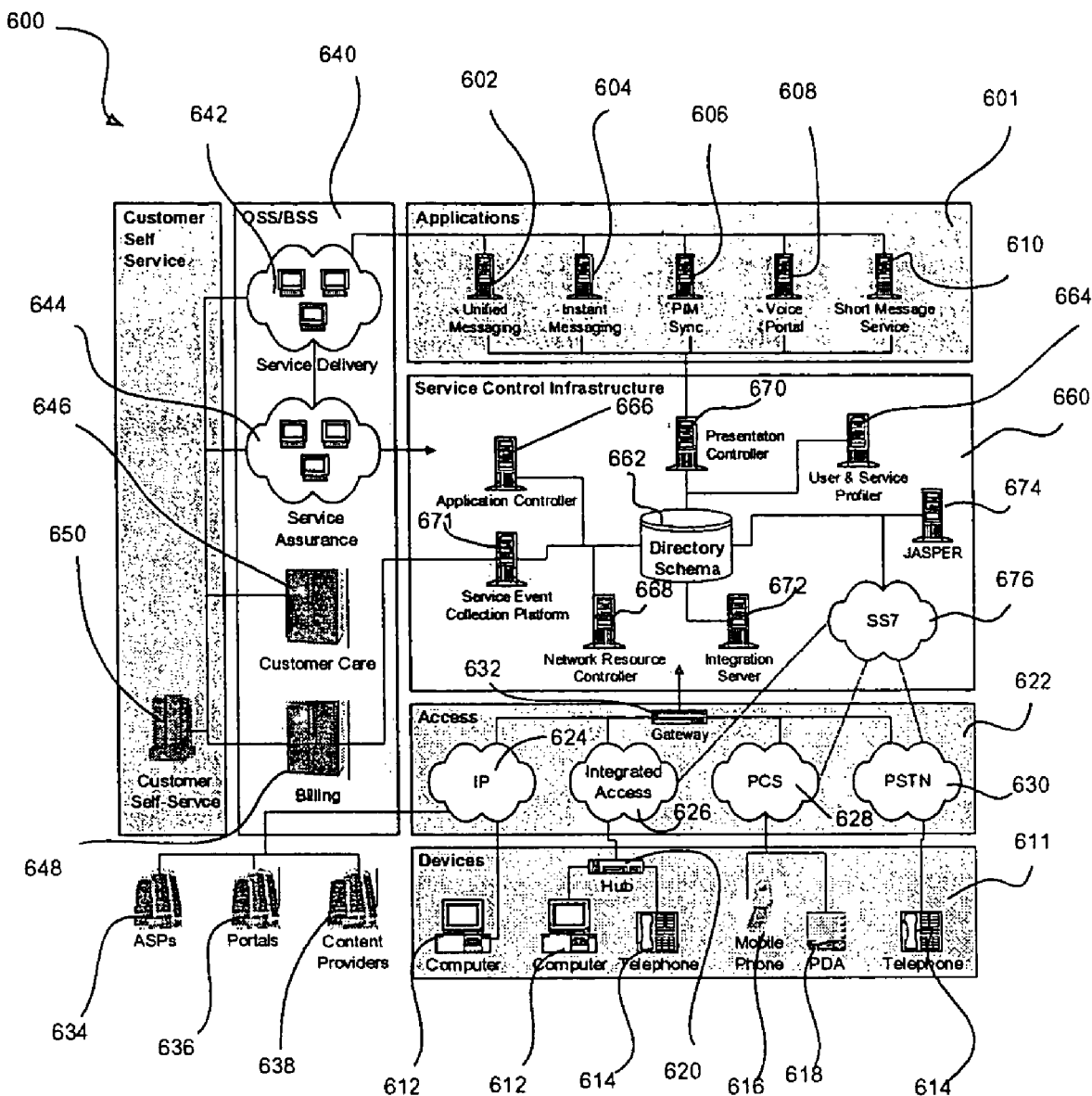
FIGS. 6 and 7 illustrate an exemplary service control architecture with which the embodiment of the foregoing figures may optionally be implemented.
Figure 7:
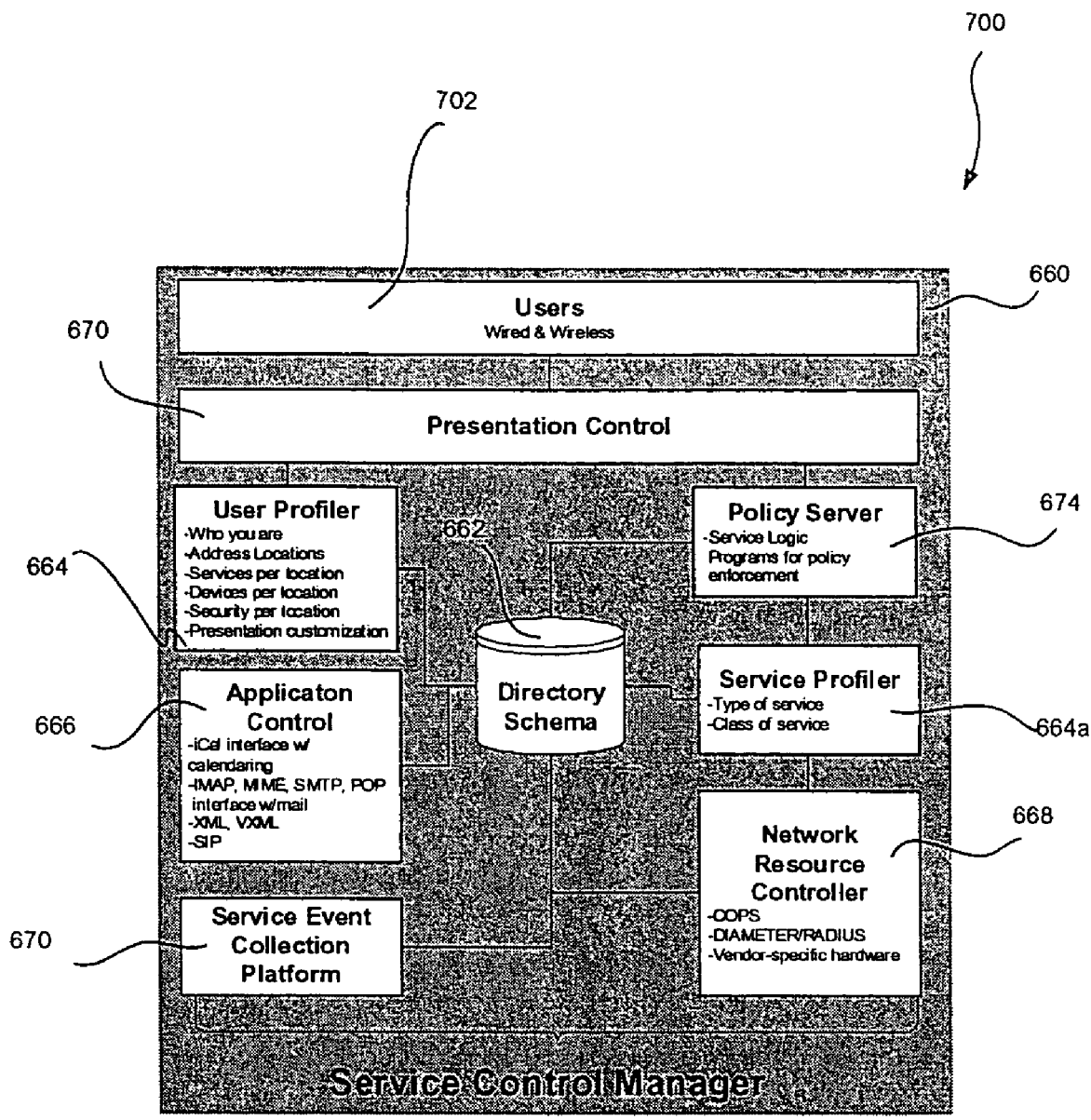

FIGS. 6 and 7 illustrate an exemplary service control architecture environment 600 with which the present embodiment may optionally be implemented. As shown, a plurality of applications 601 are provided including a unified messaging application 602, instant messaging application 604, PIM Sync application 606, voice portal application 608, and short message service application 610. Of course, any other desired applications may be provided per the desires of the user.

Further provided is a plurality of devices 611 including computers 612, telephones 614, and mobile devices such as mobile phones 616, personal digital assistants 618 (PDAs), etc. Some of such devices 611 may be coupled via a hub 620. Coupled to the devices 611 is a plurality of access networks 622. The access networks 622 include a Internet Protocol (IP) network 624, an integrated access network 626, personal communication services (PCS) network 628, and a public switched telephone network (PSTN) 630.

Each of the access networks 622 is in turn coupled to a gateway 632. Also provided is a plurality of application service providers (ASPs) 634, portals 636, and content providers 638 which are coupled to the Internet Protocol (IP) network 624.

With continuing reference to FIG. 6, a plurality of Business Support Systems and Operations Support Systems (OSS/BSS) 640 are included. In particular, the OSS/BSS 640 include a service delivery system 642 coupled to the applications 601 and a service assurance system 644 coupled thereto. The OSS/BSS 640 also include a customer care system 646 and a billing system 648. Each of the OSS/BSS 640 is coupled to a customer self-service system 650.

Next provided is a service control architecture 660 for providing intention-based, context-sensitive services to mobile users in the context of the service control architecture environment 600. First provided is a database 662. Also included is a profiler module 664 coupled to the database 662. As will become apparent, the profiler module 664 is adapted for collecting a state of a user along with profile information. Such profile information includes an identity, location, available services per location, devices per location, and/or security per location. In use, the profiler module 664 communicates the profile information to the database 662 for storage therein.

Also included is an application module 666 coupled to the database 662. The application module 666 includes a plurality of application program interfaces for interfacing with the applications 601 via the database 662. The application module 666 is adapted for allocating application resources to the applications 601 based on the profile information stored in the database 662 in a manner that will be set fort hereinafter in greater detail.

Associated therewith is a network resource module 668 coupled to the database 662 and a plurality of network routers (not shown). The network resource module 668 serves for configuring the network routers based on the profile information stored in the database 662 and the application resources allocated to the applications 601. Also coupled to the database 662 is a presentation module 670 which is in turn coupled to the applications 601. In use, the presentation module 670 is adapted for tailoring an output of the applications 601 based on the profile information.

Coupled to the billing system 648 of the OSS/BSS 640 and the database 662 is a service event collection platform 671 for tracking various events in the service control architecture environment 600 via the database 662. Such events may then be aggregated, correlated, etc. for transmission to the billing system 648 for billing purposes. Also provided is an integration server 672.

A policy server 674 is coupled to the database 662 and a Signal System 7 (SS7) network 676, the application module 666, the network resource module 668, and the presentation module 670 for controlling the operation thereof in accordance with policies identified utilizing the profile information.

The service control architecture 660 thus communicates with the OSS/BSS 640, the access networks 622 and the devices 611 via the gateway 632. Further, the service control architecture 660 communicates with the applications 601 via the presentation controller 670, and the billing system 640 via the service event collection platform 671. By this design, the service control architecture 660 serves as a hub for the service control architecture environment 600 for providing Artificial Intelligent Networks (AlN)-like capabilities in an environment including a wide range of networks 622 and devices 611.

FIG. 7 illustrates a detailed overview 700 of the service control architecture 660 and the related services associated with each of the modules thereof. Each of such modules is coupled to a plurality of users 702 utilizing the devices 611 of FIG. 6. In one embodiment, the database 662 is codified based on JAVA and/or JNDI. The database 662 provides a common data model that represents the logical relationship and data hierarchy between the users 702 and his/her services, devices and the features and functionality associated with such services. In use, the database 662 may be used to manage a user's Quality of Service (QoS), personalization and security on a per-service basis.

The profiler module 664 may include a user profiler 664 and a service profiler 664a. The profiler module 664 is adapted for collecting a state of a user along with profile information. Such profile information includes an identity, location, available services per location, devices per location, and/or security per location. The profile information may further include presentation customization for a particular user. In one embodiment, the profiler module 664 includes a data entry I/O front end application written using JAVA code.

As an option, the profiler module 664 may run on a portal server (i.e. iPlanet™, etc.) that collects information and stores the same in the database 662.

As mentioned earlier, associated with the profiler module 664 is a service profiler 664a. The service profiler 664a is adapted for evaluating input and updating service attributes for a type of service [i.e. IP telephony (voice, fax over IP, etc.); IP/VPN unified messaging; calendaring; etc.] and a class of service (i.e. platinum, gold, silver, etc.).

Service attributes may be used to define application and network resources required per service type and class of service. In use, the profiler module 664 and the service profiler 664a communicate the user and service profile information to the database 662 for storage therein.

The application module 666 includes a plurality of application program interfaces for interfacing with the applications 601 via the database 662. The application module 666 may be written using JAVA (JNDI)-based code that allocates application resources using the application program interfaces.

The application module 666 is thus adapted for allocating application resources to the applications 601 based on the profile information (i.e. the service attributes, etc.) stored in the database 662 in a manner that will be set fort hereinafter in greater detail.

The network resource module 668 may include a Nortel® scripting language on a Shasta® platform. In use, the network resource module 668 communicates with network routers to configure parameters aligned to the profile information stored in the database 662 and the application resources allocated to the applications 601. It should be noted that the network resource module 668 is further capable of implementing and enforcing the service policies to which the user has subscribed. Still yet, the network resource module 668 can dynamically allocate bandwidth based on the stored profile information.

The presentation module 670 may optionally include Java (J2EE) code with directory APIs as well as HTML and XML style sheets running on a server (i.e. iPlanet™ server, regular server, etc.). By managing channels of content and views of presentation that a user has profiled in the directory, the presentation module 670 is adapted for tailoring an output of the applications 601 based on the profile information. In particular, the presentation module 670 may be utilized to implement requests made by the user such as content channel requests (i.e. sports, stocks, news, etc.) or views (color, fonts, etc.).

The policy server 674 includes a service logic execution program (i.e. JAVA-based) that executes the policies associated with each individual service. In one exemplary implementation, the policy server 674 may be executed in two parts: 1) Shasta® box for network resource module 668 and 2) iPlanet® for application and presentation modules 666 and 670. In use, service control by the policy server 674 provides quality of service (QoS) and class of service (CoS); personalization and contextualization; and security through use of a user-defined policy; a directory; and authentication, authorization, and access control; respectively.

It should be noted that the service control architecture may take many forms, and may be used in the context of various applications. For more information, reference may be made to co-pending applications entitled "SERVICE CONTROL ARCHITECTURE" and "CONTEXT SENSITIVE ADVERTISEMENT DELIVERY FRAMEWORK" which are each invented by Michel K. Bowman-Amuah and filed concurrently herewith Ser. Nos. 10/306,979, 10/307,120, respectively, and which are incorporated herein by reference in their entirety for all purposes.

While the specification describes particular embodiments of the present invention, those of ordinary skill can devise variations of the present invention without departing from the inventive concept.

I claim:

1. A method for transferring a multimedia conference over different media for a participant of the conference, comprising:
    initiating a multimedia conference on a first medium device using a network, the network configured for:
        tracking capabilities associated with the first medium device and a second medium device,
        tracking settings associated with the first medium device and the second medium device, and
        tracking a user profile associated with the participant;
    configuring the conference according to a first set of settings associated with the first medium device and the user profile;
    enabling features associated with the conference, wherein the features are supported by a first set of capabilities associated with the first medium device;
    reconfiguring the conference according to a second set of settings associated with the second medium device and the user profile, in response to a request for transferring the conference to a second medium device;
    disabling features that are supported by the first set of capabilities associated with the first medium device and not supported by a second set of capabilities associated with the second medium device;
    enabling features that are supported by the second set of capabilities associated with the second medium device; and
    transferring and continuing the conference on the second medium device.

2. The method as recited in claim 1, wherein the first and second medium device are selected from a group consisting of a desk top computer, a personal digital assistant, a palm computer, a lap top computer, and a cellular phone.

3. The method as recited in claim 1, wherein the first medium device includes a desk top computer and the second medium device is selected from a group consisting of a personal digital assistant, a palm computer, a lap top computer, and a cellular phone.

4. The method as recited in claim 1, wherein the capabilities of the first medium device are greater than the capabilities of the second medium device.

5. The method as recited in claim 1, and further comprising matching a plurality of settings on the second medium device with a plurality of settings on the first medium device.

6. The method as recited in claim 5, wherein the settings include device settings.

7. The method as recited in claim 5, wherein the settings include user settings.

8. The method as recited in claim 5, wherein the settings include network settings.

9. The method as recited in claim 1, wherein the aspects include performance.

10. The method as recited in claim 1, wherein the aspects include features.

11. The method as recited in claim 1, wherein the aspects include format.

12. The method as recited in claim 1, wherein the method is carried out utilizing the service control architecture.

13. The method as recited in claim 12, wherein the service control architecture further includes an application module, a network resource module, a presentation module, and a policy server.

14. The method as recited in claim 12, wherein the service control architecture includes at least one of an application module, a network resource module, a presentation module, and a policy server.

15. The method as recited in claim 12, wherein the service control architecture further includes an application module coupled to the database and including a plurality of application program interfaces for interfacing with a plurality of applications, the application module adapted for allocating application resources to the applications based on the profile information stored in the database; a network resource module coupled to the database and a plurality of network routers, the network resource module adapted for configuring the network routers based on the profile information stored in the database and the application resources allocated to the applications; a presentation module coupled to the database, the presentation module adapted for tailoring an output of the applications based on the profile information; and a policy server coupled to the database, the application module, the network resource module, and the presentation module for controlling the operation thereof in accordance with policies identified utilizing the profile information.

16. The method as recited in claim 1, wherein the request to transfer the conference to the second medium device may be sent from the first medium device and may be sent from the second medium device.

17. The method as recited in claim 1, wherein the second set of capabilities associated with the second medium device may be retrieved either by identifying capabilities associated with the second medium device tracked by the network, or by receiving the second set of capabilities directly from the second medium device.

18. The method as recited in claim 1, wherein the features associated with the conference comprise at least one of a group consisting of: a shared whiteboard, a real-time textual communication, a text-to-voice capability, and a conference note-taking capability.

19. A computer program product embodied in a computer readable storage medium for causing a processing device to execute a set of computer codes for transferring a multimedia conference over different media for a participant of the conference, the computer program product comprising:

computer code for initiating a multimedia conference on a first medium device using a network, the network configured for:

tracking capabilities associated with the first medium device and a second medium device, tracking settings associated with the first medium device and the second medium device, and tracking a user profile associated with the participant;

computer code for configuring the conference according to a first set of settings associated with the first medium device and the user profile;

computer code for enabling features associated with the conference, wherein the features are supported by a first set of capabilities associated with the first medium device;

computer code for reconfiguring the conference according to a second set of settings associated with the second medium device and the user profile, in response to a request for transferring the conference to a second medium device;

computer code for disabling features that are supported by the first set of capabilities associated with the first medium device and not supported by a second set of capabilities associated with the second medium device;

computer code for enabling features that are supported by the second set of capabilities associated with the second medium device; and computer code for transferring and continuing the conference on the second medium device.

20. The computer program product as recited in claim 19, wherein the first and second medium devices are selected from a group consisting of a desk top computer, a personal digital assistant, a palm computer, a lap top computer, and a cellular phone.

21. The computer program product as recited in claim 19, wherein the first medium device includes a desk top computer and the second medium device is selected from the group consisting of a personal digital assistant, a palm computer, a lap top computer, and a cellular phone.

22. The computer program product as recited in claim 19, wherein the capabilities of the first medium device are greater than the capabilities of the second medium device.

23. The computer program product as recited in claim 19, and further comprising computer code for matching a plurality of settings on the second medium device with a plurality of settings on the first medium device.

24. The computer program product as recited in claim 23, wherein the settings include device settings.

25. The computer program product as recited in claim 23, wherein the settings include user settings.

26. The computer program product as recited in claim 23, wherein the settings include network settings.

27. The computer program product as recited in claim 19, wherein the aspects include performance.

28. The computer program product as recited in claim 19, wherein the computer program product is executed utilizing the service control architecture including at least one of an application module, a network resource module, a presentation module, and a policy server.

29. The computer program product as recited in claim 19, wherein the aspects include features.

30. The computer program product as recited in claim 19, wherein the aspects include format.

31. The computer program product as recited in claim 19, wherein the computer program product is executed utilizing the service control architecture.

32. The computer program product as recited in claim 31, wherein the service control architecture further includes an application module, a network resource module, a presentation module, and a policy server.

33. The computer program product as recited in claim 32, wherein the service control architecture further includes an application module coupled to the database and including a plurality of application program interfaces for interfacing with a plurality of applications, the application module adapted for allocating application resources to the applications based on the profile information stored in the database; a network resource module coupled to the database and a plurality of network routers, the network resource module adapted for configuring the network routers based on the profile information stored in the database and the application resources allocated to the applications; a presentation module coupled to the database, the presentation module adapted for tailoring an output of the applications based on the profile information; and a policy server coupled to the database, the application module, the network resource module, and the presentation module for controlling the operation thereof in accordance with policies identified utilizing the profile information.

34. The computer program product as recited in claim 19, wherein the request to transfer the conference to the second medium device may be sent from the first medium device and may be sent from the second medium device.

35. The computer program product as recited in claim 19, wherein the second set of capabilities associated with the second medium device may be retrieved either by identifying capabilities associated with the second medium device tracked by the network, or by receiving the second set of capabilities directly from the second medium device.

36. A system for transferring a multimedia conference over different media for a participant of the conference, the system comprising:
  a first medium device;
  a network configured to:
    track capabilities associated with the first medium device and a second medium device,
    track settings associated with the first medium device and the second medium device, and
    track a user profile associated with the participant; and
  service control logic in communication with the first medium device and the second medium device, the service control logic configured to
    configure the conference according to a first set of settings associated with the first medium device and the user profile,
    enable features associated with the conference, wherein the features are supported by a first set of capabilities associated with the first medium device,
    reconfigure the conference according to a second set of settings associated with the second medium device and the user profile, in response to a request for transferring the conference to a second medium device,
    disable features that are supported by the first set of capabilities associated with the first medium device and not supported by a second set of capabilities associated with the second medium device,
    enable features that are supported by the second set of capabilities associated with the second medium device, and
    transfer and continue the conference on the second medium device.

37. The system as recited in claim 36, wherein the request to transfer the conference from the first medium device to the second medium device may be sent from the first medium device and may be sent from the second medium device.

38. The system as recited in claim 36, wherein the second set of capabilities associated with the second medium device may be retrieved either by identifying capabilities associated with the second medium device tracked by the network, or by receiving the second set of capabilities directly from the second medium device.

39. The method as recited in claim 36, wherein the request to transfer the conference to the second medium device may be sent from the first medium device and may be sent from the second medium device.

40. The method as recited in claim 36, wherein the second set of capabilities associated with the second medium device may be retrieved either by identifying capabilities associated with the second medium device tracked by the network, or by receiving the second set of capabilities directly from the second medium device.

* * * * *